United States Patent
Gourova

(10) Patent No.: US 7,751,697 B2
(45) Date of Patent: Jul. 6, 2010

(54) HOUSING WITH GLASS WINDOW FOR OPTICAL INSTRUMENTS IN HIGH PRESSURE UNDERWATER ENVIRONMENTS

(75) Inventor: Svetlana Gourova, Midland (CA)

(73) Assignee: Raytheon Company, Waltham, MA (US)

(*) Notice: Subject to any disclaimer, the term of this patent is extended or adjusted under 35 U.S.C. 154(b) by 399 days.

(21) Appl. No.: 11/786,983

(22) Filed: Apr. 13, 2007

(65) Prior Publication Data

US 2008/0253756 A1    Oct. 16, 2008

(51) Int. Cl.
*G03B 17/08* (2006.01)

(52) U.S. Cl. ........................................... 396/27

(58) Field of Classification Search .............. 396/25–29
See application file for complete search history.

(56) References Cited

U.S. PATENT DOCUMENTS

| | | | | |
|---|---|---|---|---|
| 3,019,715 A * | 2/1962 | Arnold et al. | .................. | 396/27 |
| 3,065,666 A * | 11/1962 | Sampson | ..................... | 396/27 |
| 4,071,066 A * | 1/1978 | Schaeffer | ................. | 206/316.2 |
| 4,113,137 A * | 9/1978 | Wind | ......................... | 220/319 |
| 4,623,169 A * | 11/1986 | Hutten | ....................... | 281/45 |
| 5,335,028 A * | 8/1994 | Kosako | ...................... | 396/29 |
| 6,819,866 B2 * | 11/2004 | Da Silva | ...................... | 396/27 |
| 7,290,496 B2 * | 11/2007 | Asfar et al. | .................. | 114/312 |
| 2002/0101041 A1 * | 8/2002 | Kameyama | .................. | 277/628 |
| 2006/0177206 A1 * | 8/2006 | Takanashi | ..................... | 396/27 |
| 2006/0263075 A1 * | 11/2006 | Juan et al. | ..................... | 396/29 |

OTHER PUBLICATIONS

RTS, Inc. "Ewa-Marine Underwater/All-Weather Housings" May 2000.*

* cited by examiner

*Primary Examiner*—W. B. Perkey
*Assistant Examiner*—Dennis Hancock
(74) *Attorney, Agent, or Firm*—H. St. Julian, Esq.

(57) ABSTRACT

A housing for underwater imaging comprising a first section for housing an optical instrument; a second section secured to the first section adapted to house a window; a window disposed within the second section; and a buffer ring disposed between the window and the first section. The buffer ring is a material having a coefficient of thermal expansion approximately equal to that of the window. In the best mode, the window is optical grade glass and the buffer ring is aluminum foil. In the illustrative embodiment, a mounting ring is disposed between the buffer ring and the second section of the housing. The mounting ring is steel and must be polished, lapped, stainless steel as well. The buffer ring protects the glass window from the mounting ring. A third ring is disposed over the window and secures it to the second section of the housing. The second section is removable relative to the first section to allow for a camera to be placed within the housing and secured thereby for deep-sea underwater use at high pressure.

23 Claims, 4 Drawing Sheets

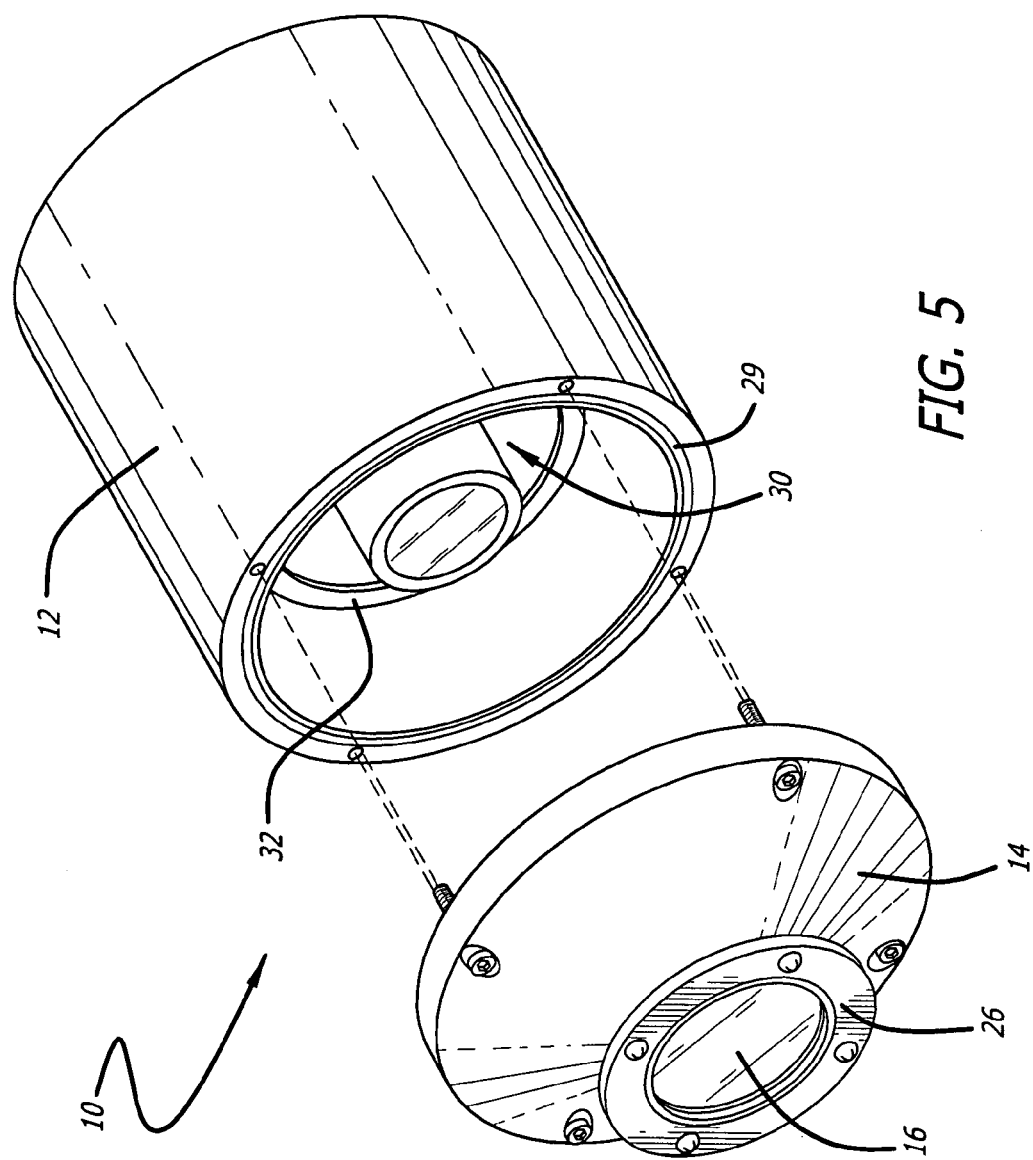
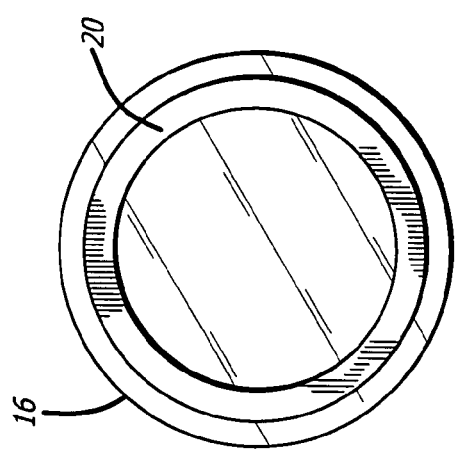
FIG. 5
FIG. 4

HOUSING WITH GLASS WINDOW FOR OPTICAL INSTRUMENTS IN HIGH PRESSURE UNDERWATER ENVIRONMENTS

BACKGROUND OF THE INVENTION

1. Field of the Invention

The present invention relates to optical and mechanical devices and systems. More specifically, the present invention relates to optical systems used for deep-sea underwater exploration.

2. Description of the Related Art

A variety of cameras are often used to record imagery during deep-sea underwater exploration. Underwater photographers have two basic options for equipment. The first is using an amphibious or waterproof camera such as the Nikonos, which is designed specifically for use underwater. More often, underwater imaging is achieved by putting a traditional film or digital camera into an watertight underwater housing. This allows many more options, since the user can choose a housing specific to their everyday "land" camera, as well as utilize any lens in their collection. For more on this topic, see Wikipedia, the free encyclopedia at http://en.wikipedia.org/wiki/Underwater_photogaphy#Camera_Equipment.

Unfortunately, as is known in the art, certain issues arise when using cameras inside a watertight housing. First, because of refraction, the image coming through the glass port will be distorted, in particular when using wide-angle lenses. The solution is to use a dome-shaped or fish-eye port, which corrects this distortion. Most manufacturers make these dome ports for their housings, often designing them to be used with specific lenses to maximize their effectiveness.

Secondly, some digital cameras do not have sufficiently wide lenses built into the camera. For this reason, many housings are made with supplementary optics in addition to the dome port, making the apparent angle of view wider.

With macro lenses, the distortion caused by refraction is not an issue, so normally a simple flat transparent port is used. In fact, refraction increases the magnification of a macro lens, so this is considered a benefit to the photographer, who may be trying to capture very small subjects.

In any event, the quality of the images acquired depends on the optical performance of the port in the protective housing through which the images are taken.

Conventionally, glass windows have been preferred for this port due to the optical performance thereof. Unfortunately, glass windows tend to be fragile in deep-sea environments due to the high pressures encountered and the typically required points of contact with metal surfaces.

Hence, acrylic windows are typically used in housings for optical instruments used for deep-sea exploration (e.g. at depths approaching 6000 meters under the surface). However, acrylic tends to deform under the high pressures (e.g. approximately 600 atmospheres) encountered in deep-sea exploration. Consequently, a compromise in optical performance has been forced on photographers using acrylic as opposed to glass.

Hence, a need remains in the art for a system or method for improving the performance of high quality optical instruments in high-pressure underwater environments. Specifically, a need remains in the art for a system or method for improving the durability of glass windows used in housing for underwater cameras.

SUMMARY OF THE INVENTION

The need in the art is addressed by the system and method of the present invention. Generally, the inventive system includes a housing for underwater imaging comprising a first section for retaining an optical instrument; a second section secured to the first section adapted to house a window; a window disposed within the second section; and a buffer ring disposed between the window and the first section. The buffer ring is a material having a coefficient of thermal expansion approximately equal to that of the window.

In the best mode, the window is optical grade glass (e.g. BK-8) and the buffer ring is aluminum foil. In the illustrative embodiment, a mounting ring is disposed between the buffer ring and the second section of the housing. The mounting ring is steel and must be polished and lapped. The buffer ring protects the glass window from the mounting ring. A third ring is disposed over the window and secures it to the second section of the housing. The second section is removable relative to the first section to allow for a camera to be placed within the housing and secured thereby for deep-sea underwater use at high pressure.

BRIEF DESCRIPTION OF THE DRAWINGS

FIG. 4 is an end view of the foil buffer ring of the illustrative embodiment of the camera housing of the present invention in place on the glass window.

FIG. 5 is a perspective view of the camera housing of FIG. 1 in an open position showing a camera in a stored position therein.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
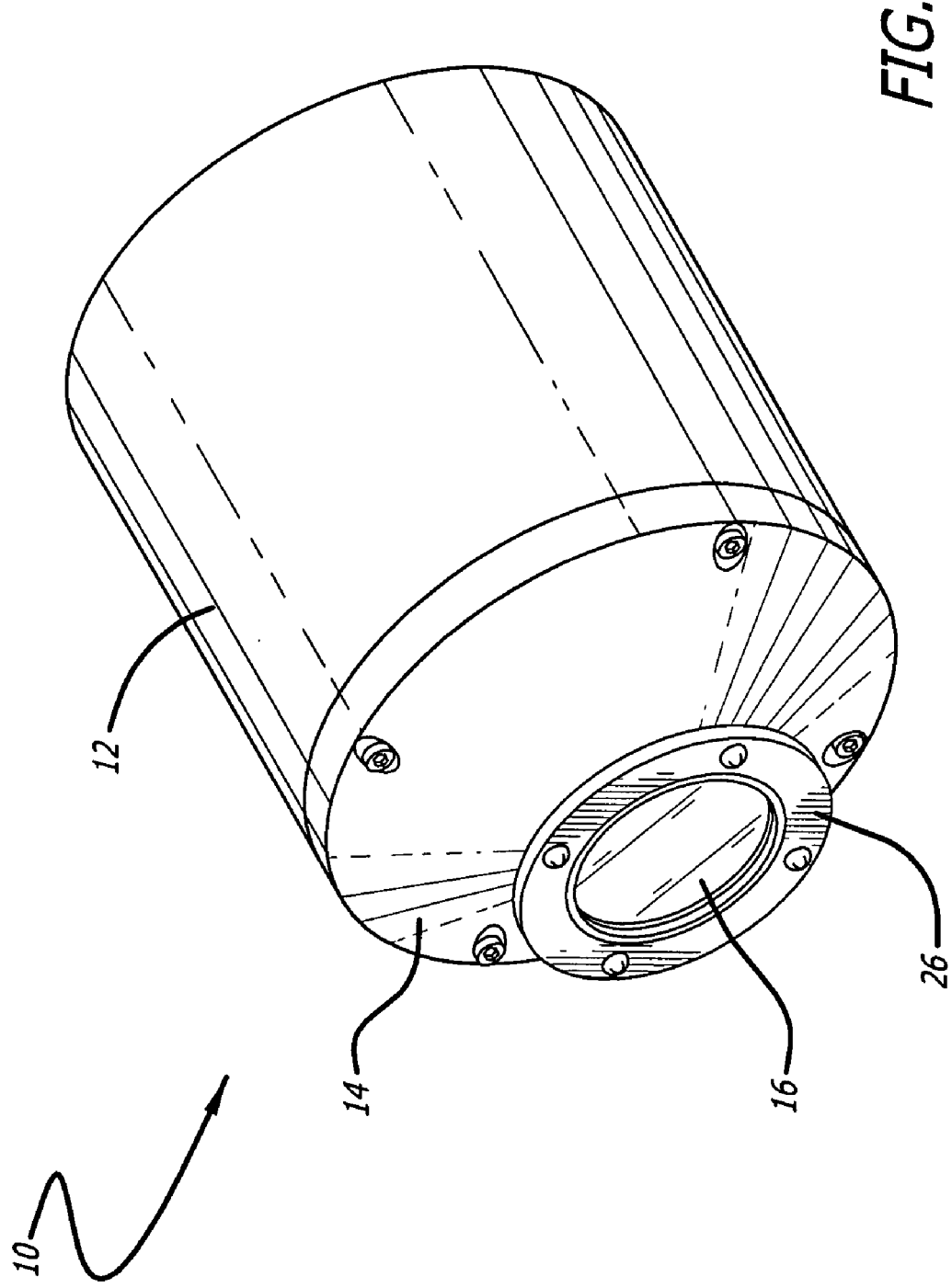
FIG. 1 is a front left perspective view of a camera housing implemented in accordance with an illustrative embodiment of the present teachings and shown in a closed position.

FIG. 1 is a front left perspective view of a camera housing for deep-sea exploration implemented in accordance with an illustrative embodiment of the present teachings. The inventive housing 10 is shown in a closed position and has a first section 12 for housing an optical instrument; a second section 14 secured to the first section adapted to house a window 16. The first and second sections are fabricated with a material suitable for a given application. In the illustrative embodiment, the first section 12 is an aluminum alloy while the second section 14 is aluminum or other material suitable for high-pressure deep-sea exploration. In any case, other materials may be used for either section without departing from the scope of the present teachings.

In accordance with the present teachings, a glass window 16 is disposed within the second section 14. This is illustrated more clearly in FIGS. 2 and 3.

Figure 2:
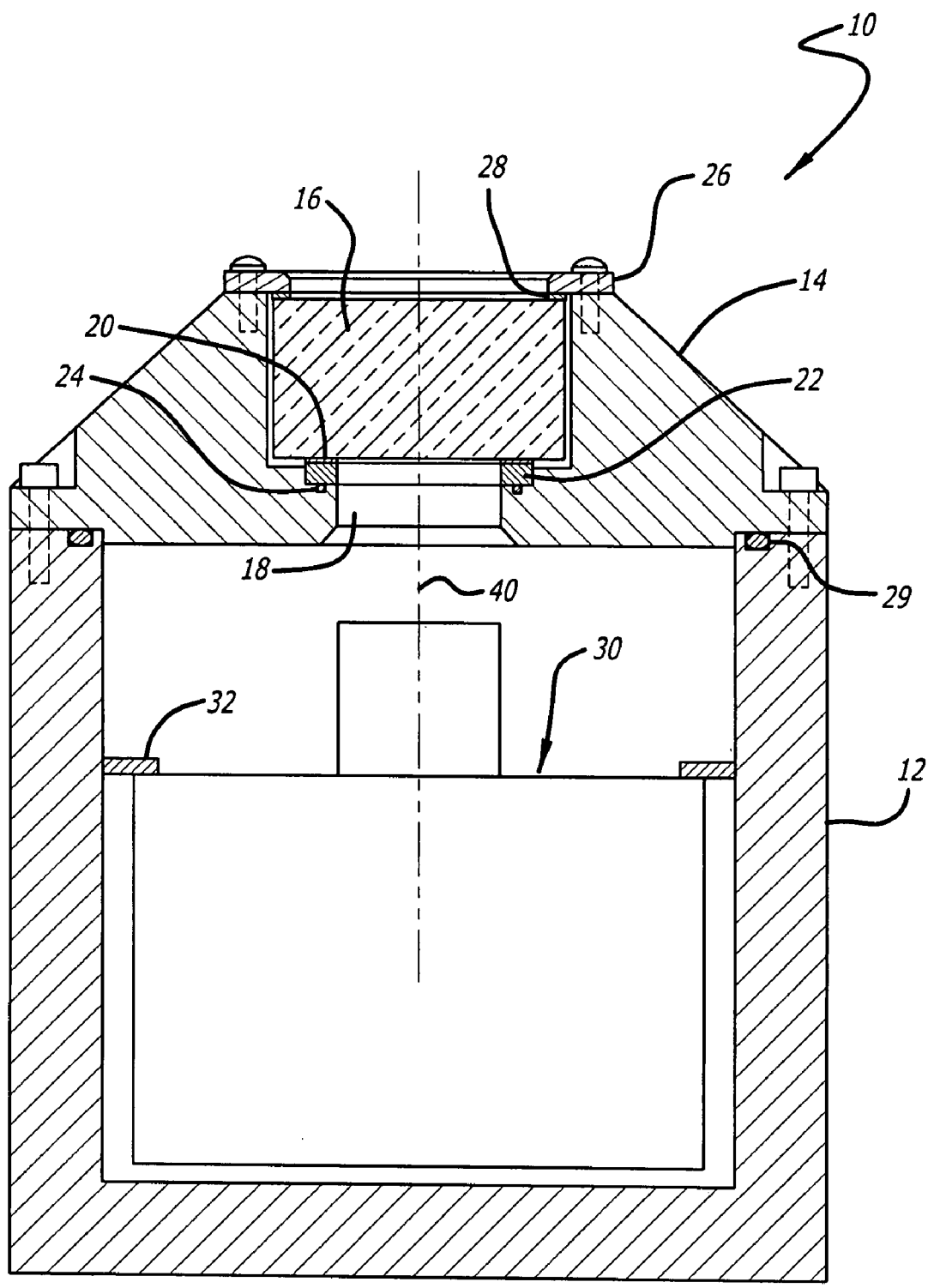
FIG. 2 is a sectional side view of the camera housing of the present invention depicted in FIG. 1.

FIG. 2 is a sectional side view of the camera housing of the present invention depicted in FIG. 1. The yield strength equation is:

$$\sigma = \frac{3(3+\mu)}{8} \cdot \frac{R^2}{t^2} P \qquad [1]$$

where:

μ is the coefficient of Puasson (for glass equal 0.2)

R is the radius of glass window t is the thickness of glass window

P is the Pressure outside of camera housing at 6000 meter underwater.

The above formula (yield strength) may be used to find a minimum thickness of glass window $t_{min}$:

$$t_{min} = R\sqrt{\frac{1 \cdot 2P}{\sigma}} \qquad [2]$$

where:

R—Radius of glass window

P—Pressure outside of camera housing (at 6000 meters underwater).

Figure 3:
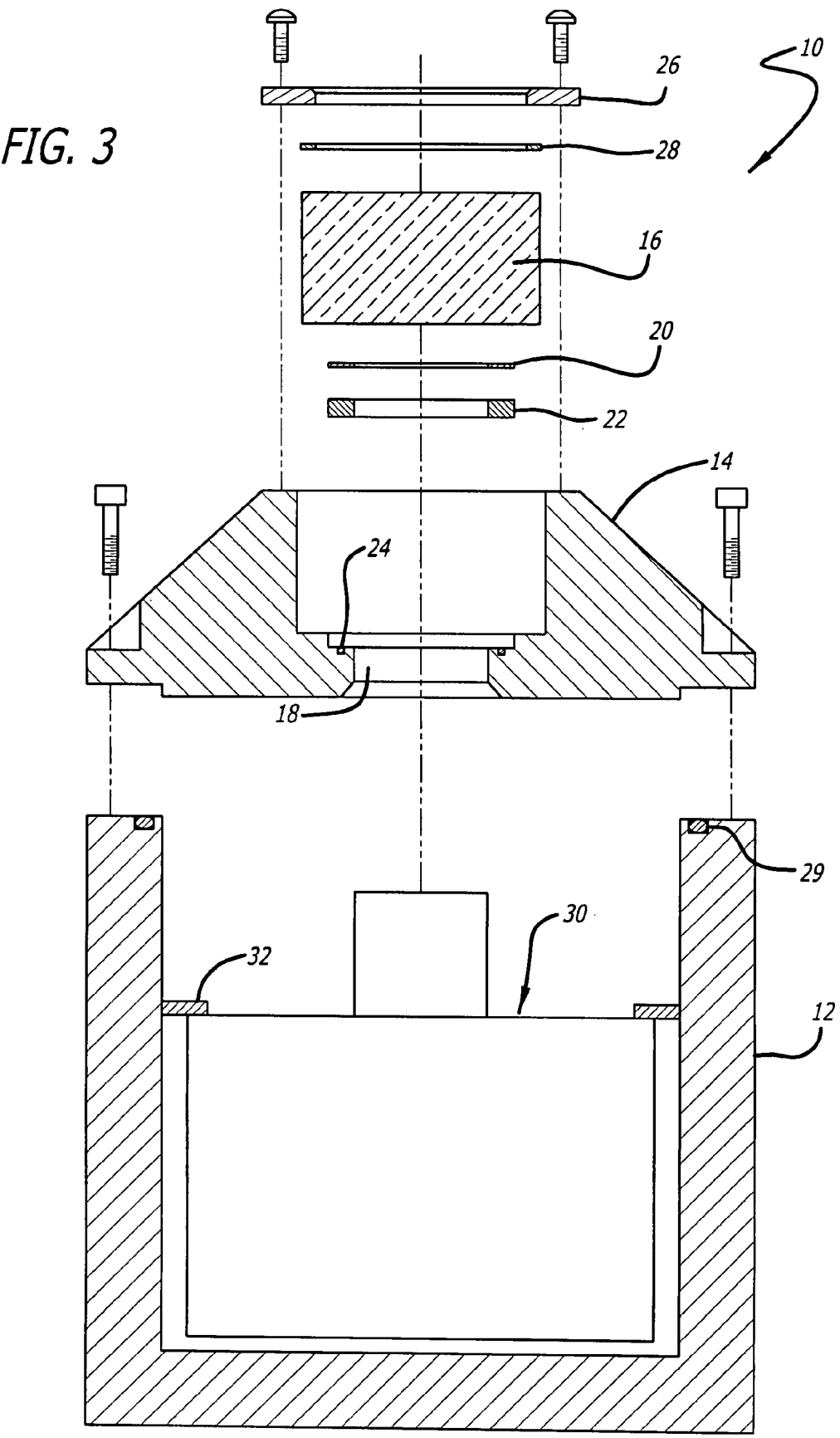
FIG. 3 is an exploded view of the camera housing of the present invention depicted in FIG. 2.

FIG. 3 is an exploded view of the camera housing of the present invention depicted in FIG. 2. The use of glass for the window 16 is enabled by the provision of a buffer ring 20 between the glass window 16 and the first section 12. The novel buffer ring 20 is illustrated in FIG. 4.

FIG. 4 is an end view of the foil buffer ring of the illustrative embodiment of the camera housing of the present invention in place relative to the glass window. In accordance with the present teachings, the buffer ring 20 is fabricated of a thin sheet of material having a coefficient of thermal expansion approximately equal to that of the material of the window, i.e., glass in the illustrative embodiment. Hence, in the best mode, for the illustrative application, the window 16 is optical grade glass (e.g. BK-8) and the buffer ring 20 is a thin sheet of aluminum foil approximately 0.09 mm thick. Those skilled in the art will appreciate that other materials may be used for the window and the buffer ring without departing from the scope of the present teachings. Also, the buffer ring may be deposited in or glued or bonded to the glass window 16. In addition, the invention is not limited to the thickness of the buffer ring or the window 16.

In FIGS. 2 and 3, a second ring 22 is shown disposed between the first ring 20 and the first section 12 of the housing 10. The second ring 22 serves as a mounting ring and may be fabricated of stainless steel or other material suitable for the high-pressure deep-sea application. The mounting ring 22 should be lapped and polished. Those of ordinary skill in the art will appreciate that at the high pressures encountered deep underwater, a glass window 16, such as that shown in FIGS. 1-3, would ordinarily be pressed against a mounting ring with tremendous pressure. Any surface imperfections in the mounting ring would tend to puncture or fracture the glass window. For this reason, acrylic windows are typically used in place of glass.

However, in accordance with the present teachings, a preferable glass window may be used due to the presence of the buffer ring 20. That is, the buffer ring 20 serves to protect the glass window 16 from imperfections in the surface of the mounting ring 22.

A third ring 26 is disposed over the window 16 and serves as a retaining ring in that it secures the window 16 to the second housing 14. Rubber sealing rings 24, 28 and 29 are included as is common in the art. The second section 14 is removable relative to the first section 12 to allow for a camera to be placed within the housing and secured thereby for deep-sea underwater use at high pressure. This is illustrated in FIG. 5.

FIG. 5 is a perspective view of the camera housing of FIG. 1 in an open position showing a camera in a stored position therein. As shown in FIGS. 2 and 5, a camera 30 (shown in phantom) is mounted in the first section 12 of the housing 10 and held in place by a second retaining ring 32. The first and second sections of the housing 10 are then secured in a closed position by inserting bolts 34 and 36 through the second section into the first section and tightening the bolts securely.

In use, with the housing in the closed position of FIG. 1, the camera 30 has a clear line of sight through an aperture 18 in the second section 14 of the housing 10 along the longitudinal axis 40 thereof.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

The invention claimed is:

1. A housing for underwater imaging comprising:

a first section for housing an optical instrument, said first section being an open-ended container sized to removably receive and retain said optical instrument therein and being fabricated of a rigid material suited to handle underwater pressures in a deep-sea application;

a second section adapted to be secured to said first section and to house a window, said second section providing a lid for watertight closure of said first section and also being fabricated of a rigid material adapted to handle underwater pressures in a deep-sea application;

a window disposed within said second sections, said window having a yield strength given by;

$$\sigma = \frac{3(3+\mu)}{8} \cdot \frac{R^2}{t^2} P \qquad [1]$$

where:

μ is the coefficient of Puasson (for glass equal 0.2),

R is the radius of glass window, t is the thickness of glass window, and

P is the pressure outside of camera housing at 6000 meter underwater; and a buffer ring disposed between said window and said second section, said ring being a material having a coefficient of thermal expansion approximately equal to that of said window.

2. The invention of claim 1 wherein said window is glass.

3. The invention of claim 2 wherein said glass is optical grade.

4. The invention of claim 3 wherein said glass is BK-8 glass.

5. The invention of claim 2 wherein said buffer ring is aluminum.

6. The invention of claim 5 wherein said buffer ring is foil.

7. The invention of claim 1 further including a mounting ring disposed between said buffer ring and said second section of said housing.

8. The invention of claim 7 wherein said buffer ring is steel.

9. The invention of claim 7 further including a retaining ring disposed over said window.

10. The invention of claim 9 wherein said retaining ring is an aluminum alloy.

11. The invention of claim 1 wherein said first section is removable relative to said second section.

12. The invention of claim 1 wherein said first section is an aluminum alloy.

13. The invention of claim 1 wherein said second section is aluminum.

14. The invention of claim 1 wherein a minimum thickness of the said window is $t_{min}$ given by:

$$t_{min} = R\sqrt{\frac{1.24\,P}{\sigma}}$$

where:
R-is a Radius of the second section of the window housing and
P-is a Pressure outside of the window housing at 6000 meters underwater.

15. A housing for underwater imaging comprising:
a first section for housing an optical instrument, said first section being an open-ended container sized to removably receive and retain said optical instrument therein and being fabricated of a rigid material suited to handle underwater pressures in a deep-sea application;
a second section adapted to be secured to said first section and to house a window, said second section providing a lid for watertight closure of said first section and also being fabricated of a rigid material adapted to handle underwater pressures in a deep-sea application;
a glass window disposed within said second section;
an aluminum buffer ring disposed between said window and said second section; and
a mounting ring disposed between said buffer ring and said second section of said housing, said mounting ring being steel.

16. The invention of claim 15 wherein said glass is optical grade.

17. The invention of claim 16 wherein said glass is BK-8 glass.

18. The invention of claim 15 further including a retaining ring disposed over said window.

19. The invention of claim 18 wherein said retaining ring is an aluminum alloy.

20. The invention of claim 15 wherein said first section is removable relative to said second section.

21. The invention of claim 15 wherein said first section is an aluminum alloy.

22. The invention of claim 15 wherein said second section is aluminum.

23. A method for protecting a camera including the steps of:
opening a housing having:
a first section for housing an optical instrument, said first section being an open-ended container sized to removably receive and retain said optical instrument therein and being fabricated of a rigid material suited to handle underwater pressures in a deep-sea application;
a second section adapted to be secured to said first section and to house a window, said second section providing a lid for watertight closure of said first section and also being fabricated of a rigid material adapted to handle underwater pressures in a deep-sea application;
a glass window disposed within said second section, window having a yield strength given by:

$$\sigma = \frac{3(3+\mu)}{8} \cdot \frac{R^2}{t^2} P \qquad [1]$$

where:
μ coefficient of Puasson (for glass equal 0.2),
R is the radius of glass window,
t is the thickness of glass window, and
P is the pressure outside of camera housing at 6000 meter underwater;
placing an optical instrument in said first section; and
closing said housing by securing said second section to said first section.

* * * * *